US012596908B2

(12) United States Patent
Dai et al.

(10) Patent No.: US 12,596,908 B2
(45) Date of Patent: Apr. 7, 2026

(54) WEAK NEURAL ARCHITECTURE SEARCH (NAS) PREDICTOR

(71) Applicant: Microsoft Technology Licensing, LLC, Redmond, WA (US)

(72) Inventors: Xiyang Dai, Seattle, WA (US); Dongdong Chen, Bellevue, WA (US); Yinpeng Chen, Sammamish, WA (US); Mengchen Liu, Redmond, WA (US); Ye Yu, Redmond, WA (US); Zicheng Liu, Bellevue, WA (US); Mei Chen, Bellevue, WA (US); Lu Yuan, Redmond, WA (US); Junru Wu, College Station, TX (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 1002 days.

(21) Appl. No.: 17/122,428

(22) Filed: Dec. 15, 2020

(65) Prior Publication Data

US 2022/0188599 A1 Jun. 16, 2022

(51) Int. Cl.
G06N 3/084 (2023.01)
G06F 11/34 (2006.01)
(Continued)

(52) U.S. Cl.
CPC ......... G06N 3/045 (2023.01); G06F 11/3409 (2013.01); G06F 18/217 (2023.01); G06N 3/08 (2013.01)

(58) Field of Classification Search
CPC ........ G06N 3/045; G06N 3/08; G06F 18/217; G06F 11/3409
See application file for complete search history.

(56) References Cited

U.S. PATENT DOCUMENTS 9,730,643 B2 * 8/2017 Georgescu ........... G06V 10/772
2017/0124409 A1 * 5/2017 Choi ........................ G06N 3/09
(Continued)

OTHER PUBLICATIONS

Chau, et al., "Brp-nas: Prediction-based nas using gens", In Repository of arXiv:2007.08668v3, Jul. 2020, pp. 1-22.
(Continued)

*Primary Examiner* — Brandon S Cole
(74) *Attorney, Agent, or Firm* — Foley IP Law, PLLC

(57) ABSTRACT

A neural architecture search (NAS) with a weak predictor comprises: receiving network architecture scoring information; iteratively sampling a search space, wherein the sampling comprises: generating a set of candidate architectures within the search space; learning a first predictor; evaluating performance of the candidate architectures; and based on at least the performance of the set of candidate architectures and the network architecture scoring information, refining the search space to a smaller search space; based on at least the network architecture scoring information, thresholding the performance of candidate architectures to determine scored output candidate architectures; and reporting the scored output candidate architectures. In some examples, the candidate architectures each comprise a machine learning (ML) model, for example a neural network (NN). In some examples, searching continues to iterate until stopping criteria is met, such as a specified maximum number of iterations or a set of candidate architectures achieves a performance goal.

20 Claims, 7 Drawing Sheets

(51) Int. Cl.

| | | |
|---|---|---|
| *G06F 18/21* | (2023.01) | |
| *G06N 3/045* | (2023.01) | |
| *G06N 3/08* | (2023.01) | |

(56) References Cited

U.S. PATENT DOCUMENTS

| | | | | |
|---|---|---|---|---|
| 2017/0213127 | A1* | 7/2017 | Duncan | G16B 50/30 |
| 2018/0204113 | A1* | 7/2018 | Galron | G06F 18/214 |
| 2019/0171438 | A1* | 6/2019 | Franchitti | G06N 5/022 |
| 2019/0286984 | A1* | 9/2019 | Vasudevan | G06N 5/01 |
| 2022/0108054 | A1* | 4/2022 | Akhauri | G06F 30/30 |

OTHER PUBLICATIONS

Chen, et al., "XGBoost: A Scalable Tree Boosting System", In Proceedings of the 22nd ACM SIGKDD International Conference on Knowledge Discovery and Data Mining, Aug. 13, 2016, 10 Pages.

Dong, et al., "Nas-bench-201: Extending the scope of reproducible neural architecture search", In 8th International Conference on Learning Representations, Apr. 26, 2020, pp. 1-16.

Guo, et al., "Single path one-shot neural architecture search with uniform sampling", In Repository of arXiv: 1904.00420v1, Apr. 2019, pp. 1-14.

Howard, et al., "Searching for mobilenetv3", In Proceedings of the IEEE International Conference on Computer Vision, Oct. 27, 2019, pp. 1314-1324.

Hu, et al., "Angle-based search space shrinking for neural architecture search", In Repository of arXiv:2004.13431v3, Apr. 28, 2020, pp. 1-21.

Liu, et al., "Darts: Differentiable Architecture Search", In Repository of arXiv:1806.09055, Jun. 24, 2018, 13 Pages.

Liu, et al., "Progressive neural architecture search", In Proceedings of the European Conference on Computer Vision, Sep. 8, 2018, pp. 1-16.

Luo, et al., "Neural architecture optimization", In Repository of arXiv:1808.07233v1, Aug. 22, 2018, 15 Pages.

Luo, et al., "Neural architecture search with gbdt", In Repository of arXiv:2007.04785v1, Jul. 9, 2020, pp. 1-15.

Ning, et al., "A generic graph-based neural architecture encoding scheme for predictor-based nas", In Repository of arXiv:2004.01899v3, Sep. 1, 2020, pp. 1-28.

Radosavovic, et al., "Designing network design spaces", In Proceedings of the IEEE/CVF Conference on Computer Vision and Pattern Recognition, Jun. 13, 2020, pp. 10428-10436.

Real, et al., "Regularized evolution for image classifier architecture search", In Proceedings of the AAAI conference on artificial intelligence, vol. 33, Jul. 17, 2019, pp. 4780-4789.

Siems, et al., "Nasbench-301 and the case for surrogate benchmarks for neural architecture search", In Repository of arXiv:2008.09777v2, Oct. 17, 2020, pp. 1-24.

Wang, et al., "Alphax: exploring neural architectures with deep neural networks and monte carlo tree search", In Repository of arXiv: 1903.11059v2, Mar. 26, 2019, 14 Pages.

Wang, et al., "Sample-Efficient Neural Architecture Search by Learning Action Space", In Journal of Computing Research Repository, Jun. 17, 2019, pp. 1-10.

Wei, et al., "Npenas: Neural predictor guided evolution for neural architecture search", In Repository of arXiv:2003.12857v1, Mar. 28, 2020, pp. 1-16.

Wen, et al., "Neural Predictor for Neural Architecture Search", In Repository of arXiv:1912.00848v1, Dec. 2, 2019, pp. 1-13.

Wu, et al., "Fbnet: Hardware-aware efficient convnet design via differentiable neural architecture search", In Proceedings of the IEEE Conference on Computer Vision and Pattern Recognition, Jun. 16, 2019, pp. 10734-10742.

Ying, et al., "Nas-bench-101: Towards reproducible neural architecture search", In Proceedings of International Conference on Machine Learning, May 24, 2019, 10 Pages.

Zoph, et al., "Learning Transferable Architectures for Scalable Image Recognition", In Proceedings of the IEEE conference on computer vision and pattern recognition, Apr. 11, 2018, pp. 8697-8710.

Zoph, et al., "Neural Architecture Search with Reinforcement Learning", In Repository of arXiv: 1611.01578v1, Nov. 5, 2016, 15 Pages.

* cited by examiner

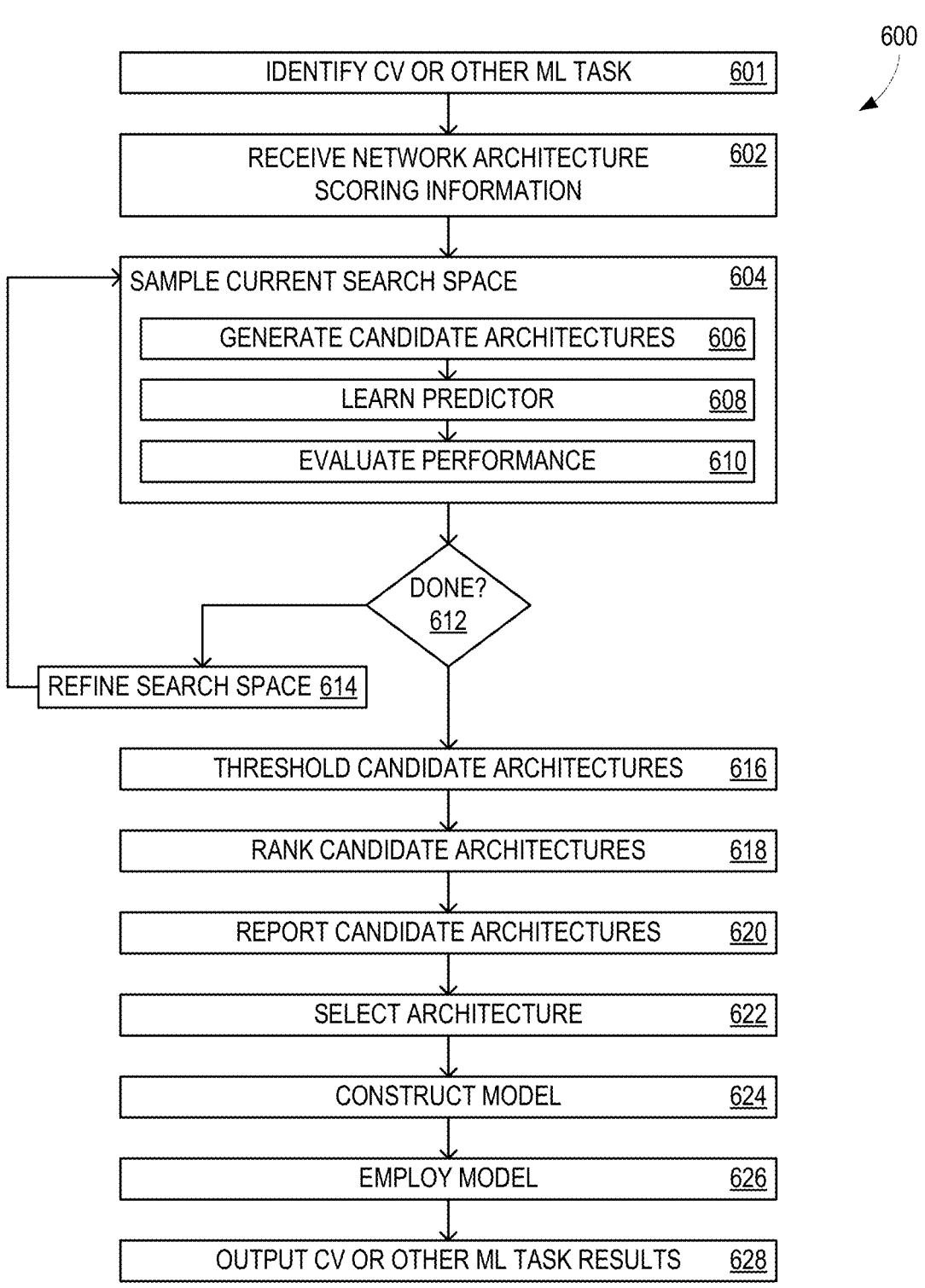

600

IDENTIFY CV OR OTHER ML TASK     601

RECEIVE NETWORK ARCHITECTURE SCORING INFORMATION     602

SAMPLE CURRENT SEARCH SPACE     604

GENERATE CANDIDATE ARCHITECTURES     606

LEARN PREDICTOR     608

EVALUATE PERFORMANCE     610

DONE?     612

REFINE SEARCH SPACE     614

THRESHOLD CANDIDATE ARCHITECTURES     616

RANK CANDIDATE ARCHITECTURES     618

REPORT CANDIDATE ARCHITECTURES     620

SELECT ARCHITECTURE     622

CONSTRUCT MODEL     624

EMPLOY MODEL     626

OUTPUT CV OR OTHER ML TASK RESULTS     628

Figure 8:
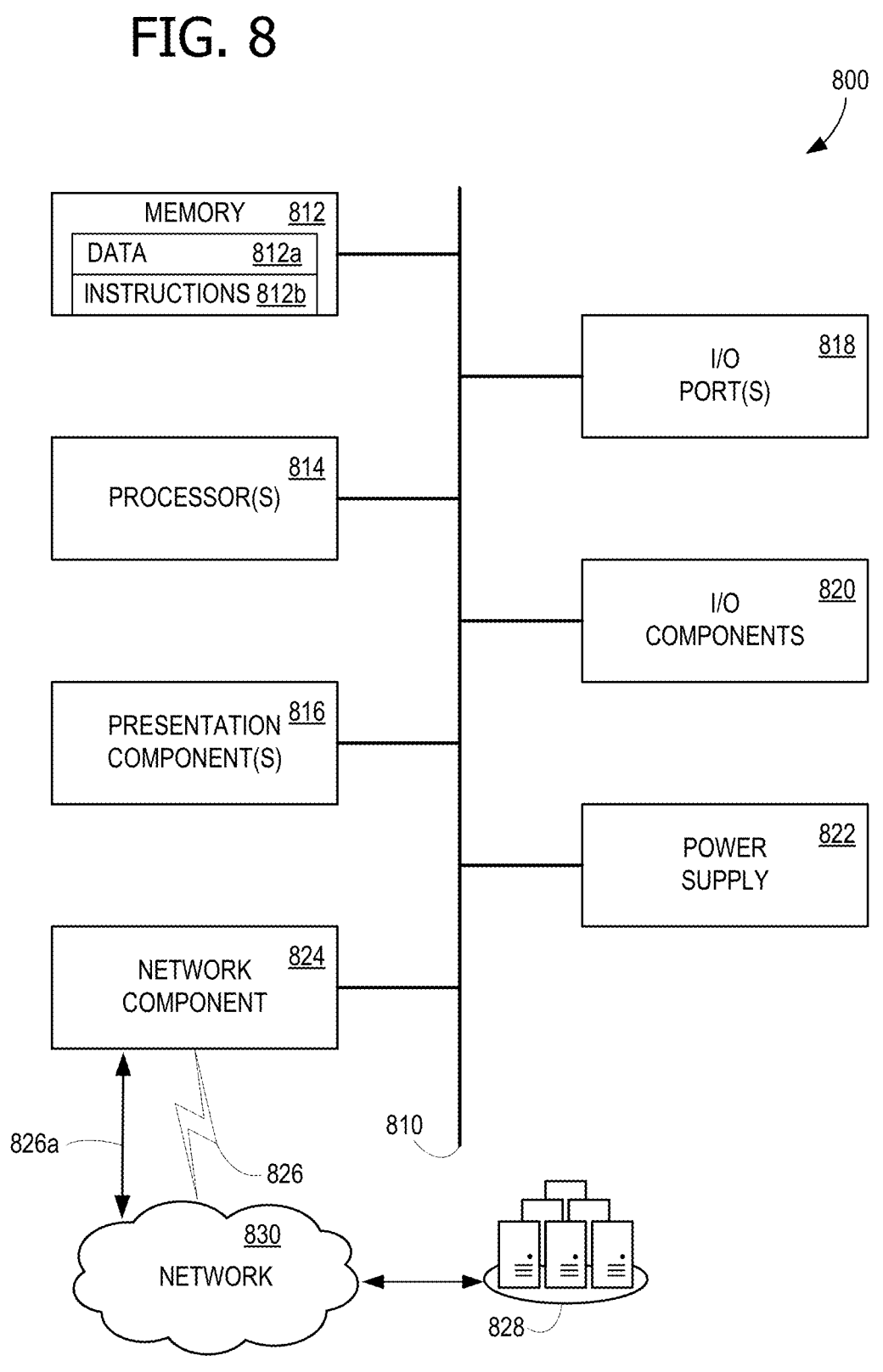

| MEMORY | 812 |
| DATA | 812a |
| INSTRUCTIONS 812b |

I/O PORT(S) 818

PROCESSOR(S) 814

I/O COMPONENTS 820

PRESENTATION COMPONENT(S) 816

POWER SUPPLY 822

NETWORK COMPONENT 824

810

826a

826

830 NETWORK

828

WEAK NEURAL ARCHITECTURE SEARCH (NAS) PREDICTOR

BACKGROUND

Performance of artificial intelligence (AI) and machine learning (ML), which are together referred to herein as ML, depends heavily on the suitability of the underlying architecture for solving particular tasks. In some scenarios, constructing an appropriate ML model, for example a trained neural network (NN) with the proper number of layers and the proper configuration, may require a highly-skilled team a period of multiple months (perhaps even a year). Automated neural architecture search (NAS) efforts seek to reduce this time by sampling a search space (architecture search space) and modelling performance of candidate architectures with a predictor. Unfortunately, exhaustive sampling may be prohibitively burdensome, and thinning the samples to a more manageable number may result in missing an optimal solution.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

A neural architecture search (NAS) with a weak predictor comprises: receiving network architecture scoring information; iteratively sampling a search space, wherein the sampling comprises: generating a set of candidate architectures within the search space; learning a first predictor; evaluating performance of the candidate architectures; and based on at least the performance of the set of candidate architectures and the network architecture scoring information, refining the search space to a smaller search space; based on at least the network architecture scoring information, thresholding the performance of candidate architectures to determine scored output candidate architectures; and reporting the scored output candidate architectures. In some examples, the candidate architectures each comprise a machine learning (ML) model, for example a neural network (NN). In some examples, searching continues to iterate until stopping criteria is met, such as a specified maximum number of iterations or a set of candidate architectures achieves a performance goal.

BRIEF DESCRIPTION OF THE DRAWINGS

The disclosed examples are described in detail below with reference to the accompanying drawing figures listed below:

FIG. 2 shows a framework for the use of the arrangement of FIG. 1;

FIG. 6 is a flowchart illustrating exemplary operations associated with performing searching in a NAS process;

FIG. 8 is a block diagram of an example computing environment suitable for implementing some of the various examples disclosed herein.

Corresponding reference characters indicate corresponding parts throughout the drawings.

DETAILED DESCRIPTION

Figure 1:
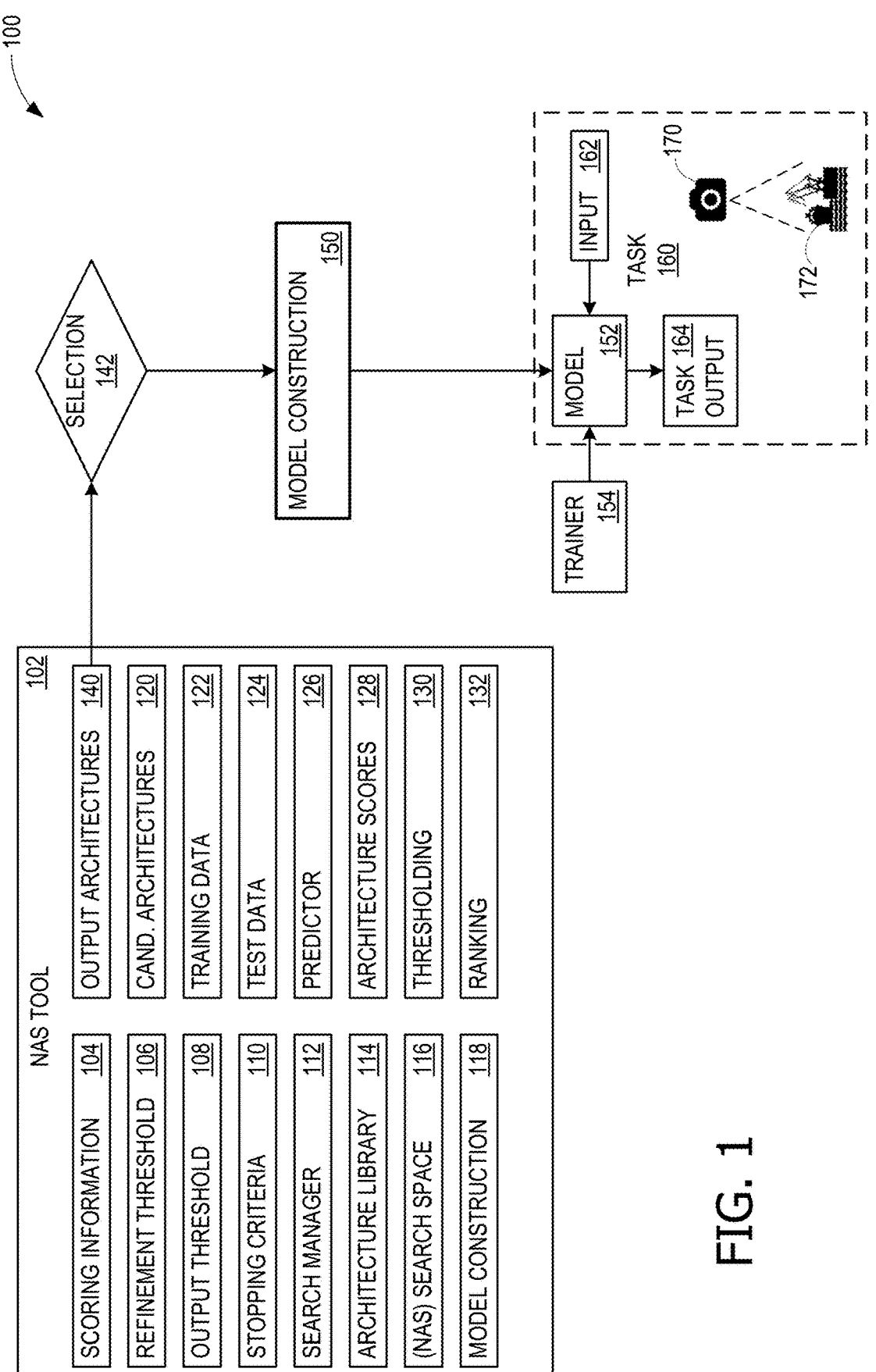
FIG. 1 illustrates an arrangement for neural architecture search (NAS)

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Computer vision (CV) tasks other ML task are often accomplished by neural network (NN) models, for example, detecting ground-based vehicles (e.g., ships or trucks) from overhead imagery (e.g., aircraft or satellite), or language processing results (e.g., speech transcription). A neural architecture search (NAS) with a weak predictor comprises: receiving network architecture scoring information; iteratively sampling a search space, wherein the sampling comprises: generating a set of candidate architectures within the search space; learning a first predictor; evaluating performance of the candidate architectures; and based on at least the performance of the set of candidate architectures and the network architecture scoring information, refining the search space to a smaller search space; based on at least the network architecture scoring information, thresholding the performance of candidate architectures to determine scored output candidate architectures; and reporting the scored output candidate architectures. In some examples, the candidate architectures each comprise an ML model, for example an NN. Artificial intelligence (AI) and ML are together referred to herein as ML. In some examples, searching continues to iterate until stopping criteria is met, such as a specified maximum number of iterations or a set of candidate architectures achieves a performance goal.

Aspects of the disclosure operate in an unconventional manner by iteratively sampling a (NAS) search space with increasingly refined, smaller search spaces, and evaluating performance of candidate architectures with predictors for those candidate architectures. This permits use of weak NAS predictors that outperform searching with a single strong NAS predictor, by returning a more optimal output architecture. Aspects of the disclosure improve the speed and efficiency of computing operations, because the iterative use of weak NAS predictors may be faster and more computationally efficient that the use of a single strong NAS predictor, even while the weak NAS predictors provide a more optimal output architecture. This automated approach replaces human labor, providing significant time savings.

Progressively shrinking a sample space, based on predictions from previous weak predictors, and training a new weak predictor may produce superior architectures, even while significantly reducing the number of samples needed to reach an optimal architecture. An initial predictor includes contributions from a larger search space, potentially limiting its performance. If the initial predictor is not used to identify the final architecture, but is instead used to identify a smaller, more refined search space, the next predictor will offer superior performance. Iterating this process produces a series of progressively improved predictors, until stopping criteria is met, and the final set of architectures may be output. For example, the final (smallest) search space may be an embedding subspace where the best architectures reside.

Because early-stage predictors have a relaxed task (e.g., pointing to a next-stage search space, rather than the final result), the predictors may be weak predictors (e.g., predictors based on sparser samples than what would be used for a strong predictor). This may significantly simplify the learning task of each predictor. In some examples, the trade-off is such that even though additional predictors are needed (over the single strong predictors), the increase in efficiency results in less total time (and fewer total samples) required to identify the final set of output architectures.

The disclosed efficient techniques may be employed to automatically search best convolutional neural network (CNN) architectures for multiple classes of CV tasks (e.g., image classification, object detection, action understanding, and others). Disclosed techniques may further be advantageously used for additional types of architectures, adapter to tasks beyond CV, for example natural language processing tasks.

FIG. 1 illustrates an arrangement 100 that includes a NAS tool 102, which performs iterative searching for an optimal network architecture to use for an ML task 160. In some examples, the ML task 160 includes CV tasks as illustrated, in which a sensor 170 collects overhead imagery containing a target 172 (e.g., a ship or a truck) and detects, recognizes, or otherwise classifies the imagery or the target 172. Other examples of the ML task 160 includes include CV in other imagery and language processing (e.g., speech recognition.

NAS tool 102 holds network architecture scoring information 104, a refinement threshold 106, an output threshold 108, and stopping criteria 110. Network architecture scoring information 104 is used as a performance goal and may be used for determining candidate architecture scores 128. Refinement threshold 106 is used by a thresholding component 130 to identify architectures within candidate architectures 120 that have sufficient performance or insufficient performance for including in the next iteration. This information is used to refine a search space 116. Output threshold 108 is used by thresholding component 130 to identify architectures within candidate architectures 120 that have sufficient performance to be included in output architectures 140. In some examples, refinement threshold 106 and output threshold 108 are the same or similar.

Stopping criteria 110 is used by a search manager 112 to stop iteration of the search. That is, search manager 112 iterates the searching, as described herein, until stopping criteria 110 is met. In some examples, stopping criteria 110 may be a specified maximum number of iterations, or determining that a set of candidate architectures within candidate architectures 120 has achieved a performance goal (as measured by candidate architecture scores 128). Any of network architecture scoring information 104, refinement threshold 106, output threshold 108, and stopping criteria 110 may be received from (specified by) a user of NAS tool 102. In some examples, any of network architecture scoring information 104, refinement threshold 106, output threshold 108, and stopping criteria 110 may be altered or adjusted while NAS tool 102 is operating (e.g., iteratively searching increasingly refined search space 116), in order to guide search results. This provides additional flexibility over a single-stage search with a strong NAS predictor.

In operation, search manager 112 has selection and sampling logic to intake architecture library 114, which holds a set of candidate architectures, and select candidates within search space 116. In some examples, architecture library 114 holds a set of NN models with 10-20 and/or CNN models. Initially, search space 116 starts relatively complete, and is refined during the progressing iterations. In some examples, refinement is shrinking search space 116 to a subset of its prior iteration version. In some examples, refinement may include expanding a border of search space 116 to include some space that had not been within its prior iteration version. The accuracy of each candidate is factored into candidate architecture scores 128, and search manager 112 samples newly refined search space 116.

The candidates thus selected are constructed (e.g., connection weights are assigned) by a model construction component 118, which trains and tests them with training data 122 and test data 124, respectively, to produce candidate architectures 120. In some examples, training data 122 and test data 124 may be provided by a human user of NAS tool 101. A predictor 126 learns on candidate architectures 120 and generates candidate architecture scores 128. In some examples, predictor 126 is an NN, for example a two-layer NN. In some examples, predictor 126 may be a different ML model. After completion of the final iteration (as determined by search manager 112 using stopping criteria 110), candidate architectures 120 that meet output threshold 108 become output candidate architectures 140. In some examples, a ranking component 132 ranks output candidate architectures 140.

A selection operation 142 selects one or more of output candidate architectures 140 for a model construction operation 150, which constructs an ML model 152 (based on a selected candidate from output candidate architectures 140). ML model 152 is trained by a trainer 154. Model construction operation 150 and/or trainer 154 may be similar to, and/or use similar data and methods as, model construction component 118 and training data 122. To perform ML task 160, trained ML model 152 is fed input 162 and provides a task output 164. In some examples, ML task 160 may include data mining, language processing, image classification, object detection, object recognition, language processing, and action understanding.

Figure 2:
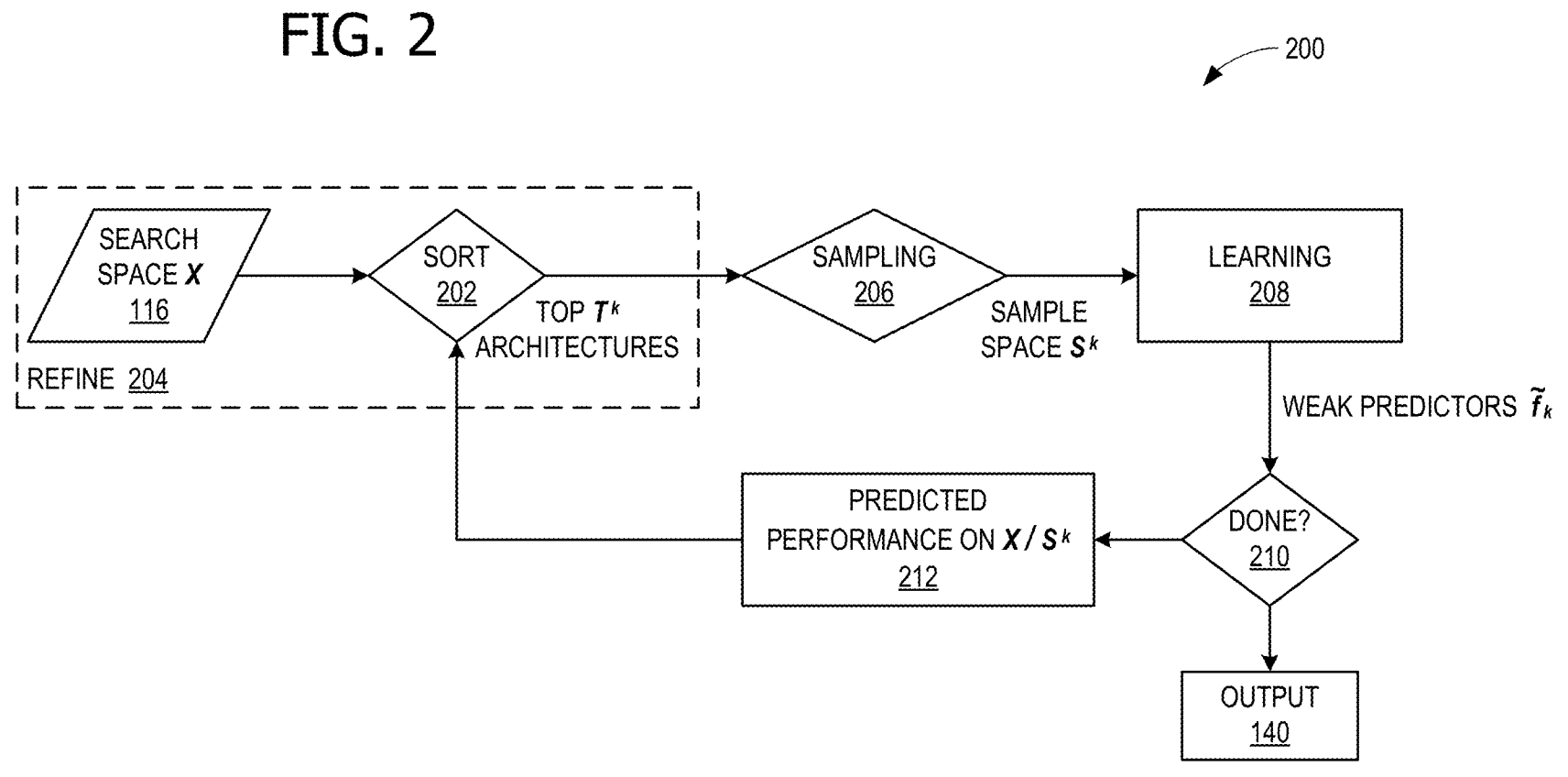

FIG. 2 shows a framework 200 for using NAS tool 102. Search space 116 is sorted 202 to find the top ranked architectures, $T^k$, and upon successive iterations this becomes a refinement 204. Architectures $T^k$ are provides to a sampling stage 206 that is followed by a learning stage 208. With coarse-to-fine iterations, jointly optimizing sampling stage 206 and learning stage 208, the ranking of the sampling space is refined, leading to optimal architectures.

Given a search space (e.g., search space 116) of network architectures X and a discrete architecture-to-performance mapping function $f:X \rightarrow P$ from architecture set X to performance set P, the objective is to find the best neural architecture $x^*$ with the highest performance $f(x)$ in the search space X:

$$x^* = \arg\max_{x \in X} f(x) \qquad \text{Eq. (1)}$$

However, this may be prohibitively expensive since all architectures may need to be exhaustively trained from scratch. Thus, a proxy predictor $\tilde{f}(x)$ is introduced to approximate $f(x)$:

$$x^* = \arg\max_{x \in X} \tilde{f}(x|S)$$

$$\text{s. t. } \tilde{f} = \arg\min_{S, \tilde{f} \in \tilde{F}} \Sigma_{s \in S} L\left(\tilde{f}(s), f(s)\right) \qquad \text{Eq. (2)}$$

where L is the loss function for predictor $\tilde{f}$, $\tilde{F}$ is a set of all possible approximations to f, and $S := \{S \subseteq X \mid |S| \leq C\}$ is the training pairs for predictor $\tilde{f}$ given sample budget C, which is correlated with the training cost. The objective is to minimize L of predictor $\tilde{f}$, based on some sampled architecture S.

Sampling stage 206 may be described using Equations (3) and (4), and learning stage 208 may be described using Equation (5):

$$\tilde{P}^k = \{\tilde{f}_k(s) | s \in X \backslash S^k\} \qquad \text{Eq. (3)}$$

$$S^{k+1} = \arg\max_{T^k}(\tilde{P}^k) \cup S^k \qquad \text{Eq. (4)}$$

$$x^* = \arg\max_{x \in X} \tilde{f}(x | S^{k+1})$$

$$\text{s.t. } \tilde{f}_{k+1} = \arg\min_{\tilde{f}_k \in F} \Sigma_{s \in S^{k+1}} L(\tilde{f}(s), f(s)) \qquad \text{Eq. (5)}$$

In general, this iterative process has K iterations. At the $k^{th}$ iteration, where k=1, 2, ... K, training set $S^1$ is initialized by randomly sampling a few architectures from X to train an initial predictor $\tilde{f}_1$. The sampling set $S^1$ and predictor $\tilde{f}_k$ are jointly optimized in a progressive manner for K iterations.

At sampling stage 206, the architectures are sorted in the search space X, according to predicted performance $\tilde{P}^k$ at every iteration k. Given sample budget C, new architectures $S^{k+1}$ are sampled among the top $T^k$ ranked architectures. At learning stage 208, predictor $\tilde{f}_k$ is learned, where L is minimized for predictor $\tilde{f}_k$, based on sampled architectures $S^k$. The architectures X are evaluated in the search space, using the learned predictor $\tilde{f}_k$ to obtain the predicted performance $\tilde{P}^k$. Throughout the iterations, predictor $\tilde{f}_k$ guides the sampling process to zoom into more promising architecture samples. In addition, the better-performing samples $S^{k+1}$ (sampled from the more promising architecture samples) improve the performance of predictor $\tilde{f}_k$. A stopping decision 210 uses stopping criteria 110 to either forward predicted performance data 212 back to refinement 204, or outputs output architectures 140.

Figure 3:
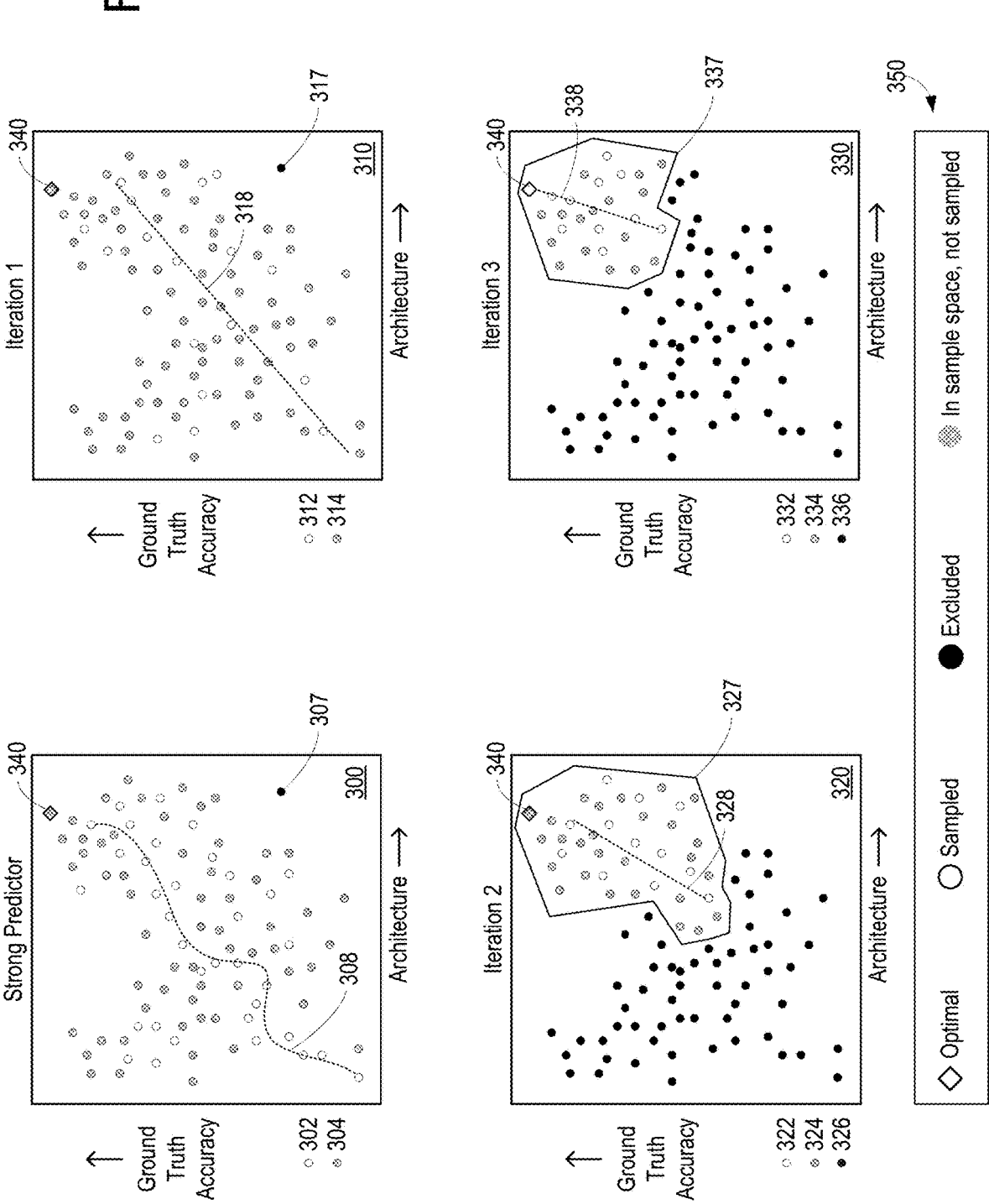
FIG. 3 illustrates the progress of iteratively searching (as may be performed using the arrangement of FIG. 1), in comparison with searching using a single predictor.

FIG. 3 illustrates the progressive improvement over three iterations, compared with using a single predictor. A plot 300 shows a set of sampled architectures 302 (hollow circles) and a set of unsampled architectures 304 (shaded circles) in a search space 307. A single predictor 308 is notionally indicated as a dashed line through search space 307 but misses an optimal architecture 340. This is because, even though predictor 308 is a strong predictor (given that all sampled architectures 302 are a sufficient percentage of all possible architectures), it is prohibitively expensive to exhaustively search all possible architectures within search space 307 (e.g., all architectures within search space 307 are sampled architectures 302, and there are no unsampled architectures 304). Because search space 307 is the entire initial search space, predictor 308 includes sampled architectures 302 that are far from optimal architecture 340, potentially degrading the performance of predictor 308. A legend 350 is shown to assist in interpreting the symbols.

A plot 310 shows a set of sampled architectures 312 (hollow circles) and a set of unsampled architectures 314 (shaded circles) in a search space 317. Search space 317 may be an initial version of search space 116 of FIG. 1. An initial predictor 318 (e.g., an initial version of predictor 126) is notionally indicated as a dashed line through search space 317 but misses optimal architecture 340. If sampled architectures 312 are far fewer in number than sampled architectures 302 (as a percentage of all possible architectures) predictor 318 will be a weak predictor. Because search space 317 is the entire initial search space (at least for this first iteration), predictor 318 includes sampled architectures 312 that are far from optimal architecture 340, potentially degrading the performance of predictor 318.

A plot 320 shows a second iteration, in which search space 317 has been refined (e.g., shrunk) to a smaller search space 327. Search space 317 may be a refined version of search space 116. Plot 320 has a set of sampled architectures 322 (hollow circles) and a set of unsampled architectures 324 (shaded circles), within search space 327, and a set of excluded architectures 326 that are outside search space 327. A new, refined predictor 328 (e.g., a later version of predictor 126) is notionally indicated as a dashed line through search space 327 and comes closer to optimal architecture 340. (Predictor 328 may also be a weak predictor). Because search space 327 has focused more closely to optimal architecture 340, predictor 328 may be expected to perform better than prior predictor 318.

A plot 330 shows a third iteration, in which search space 327 has been further refined (e.g., shrunk) to a smaller search space 337. Search space 317 may be a further-refined version of search space 116. Plot 330 has a set of sampled architectures 332 (hollow circles) and a set of unsampled architectures 334 (shaded circles), within search space 337, and a set of excluded architectures 336 that are outside search space 337. A newer, further-refined predictor 338 (e.g., a yet later version of predictor 126) is notionally indicated as a dashed line through search space 337 and comes the closest yet to optimal architecture 340. (Predictor 338 may also be a weak predictor). Because search space 337 has focused even more closely to optimal architecture 340, predictor 338 may be expected to perform better than prior predictor 388. Although three iterations are illustrated in FIG. 3, it should be understood that a different number of iterations may be used, in some examples.

Figure 4:
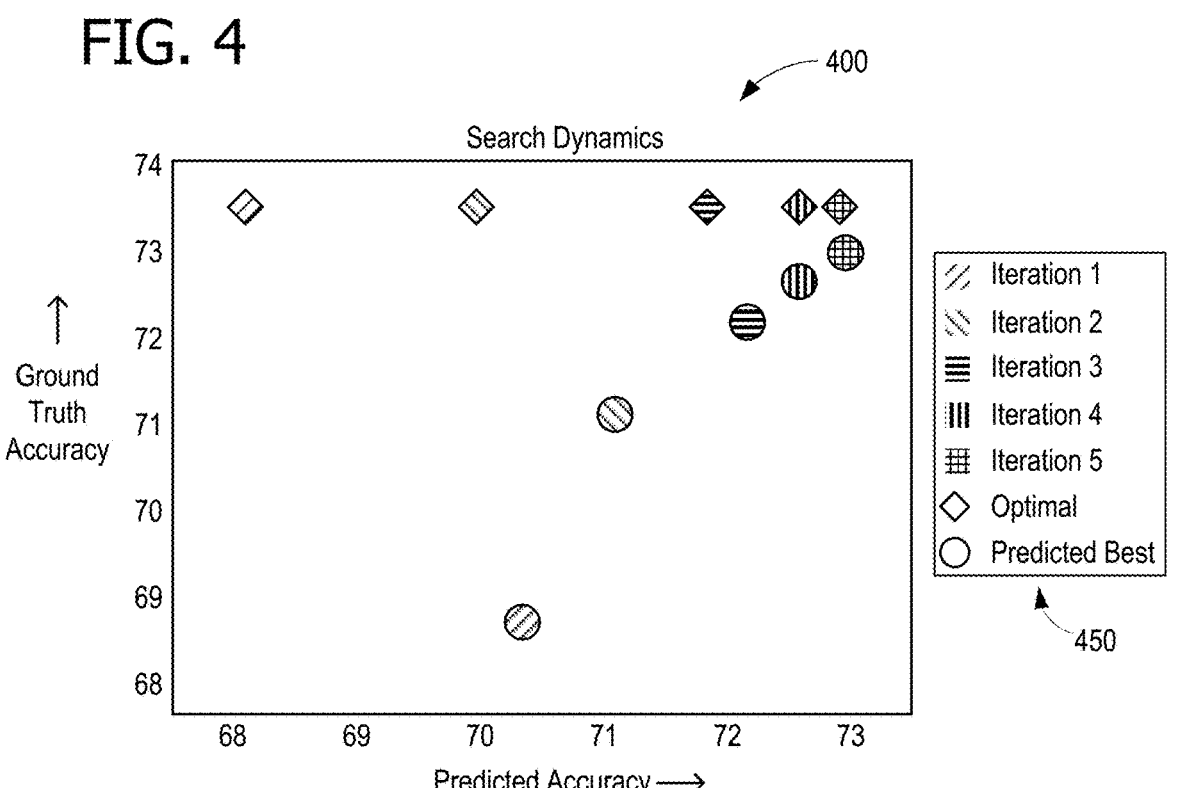
FIG. 4 also illustrates progress of iteratively searching (as may be performed using the arrangement of FIG. 1)

FIG. 4 illustrates progress of iteratively searching, although indicating five iterations in the search. As indicated in plot 400, for iteration 1, the predicted best architecture is relatively distant from the optimal architecture. This improves until, at iteration 5, the predicted best architecture is nearly coincident with the optimal architecture. A legend 450 is shown to assist in interpreting the symbols. Accuracy values (predicted and ground truth) in an example test of the disclosed NAS search process using five (5) iterations improved from approximately 68 up to approximately 73, as shown in plot 400. Thus, plot 400 demonstrates that the disclosed NAS search process improves with subsequent iterations.

Figure 5:
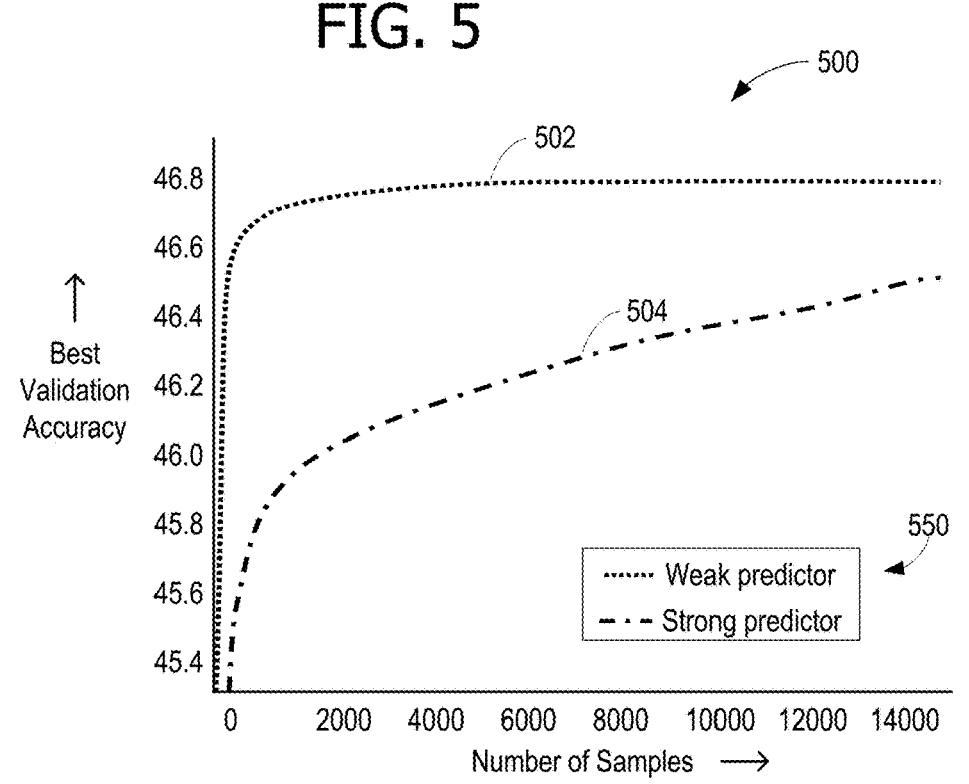
FIG. 5 demonstrates a performance improvement using the arrangement of FIG. 1.

FIG. 5 demonstrates a performance improvement using a plot 500 showing the best validation accuracy as a function the number of samples used in the search. An accuracy results curve 502 for an iterative search with weak predictors rapidly approaches a maximum achievable accuracy, whereas an accuracy results curve 504 for a single-stage search with a strong predictor lags in comparison. A legend 550 is shown to assist in identifying the plot lines. In an example test of the disclosed NAS search process using a varying number of samples (up to 14,000, as shown) validation accuracy rapidly reached the plateau validation accuracy of approximately 46.7 with only 2,000 samples, whereas when using a strong predictor, validation accuracy remained considerably lower (e.g., approximately 46 with only 2,000 samples, and only 46.4 with 14,000 samples). Thus, plot 500 demonstrates that iterating with a weak NAS predictor outperforms using a single strong NAS predictor.

FIG. 6 is a flowchart 600 illustrating exemplary operations associated with performing searching in a NAS process to identify an ML model suitable for performing an ML task (e.g., data mining, language processing, image classification, object detection, object recognition, language processing, and action understanding). In some examples, operations described for flowchart 600 are performed by computing device 800 of FIG. 8. Flowchart 600 commences with operation 601, which includes identifying the ML task 160, such as a CV task or other ML task to be accomplished by the model 152, for example, detecting ground-based vehicles (e.g., ships or trucks) from overhead imagery (e.g., aircraft or satellite), or language processing results (e.g., speech transcription).

Operation 602 includes receiving network architecture scoring information 104. Operation 604 includes sampling search space 116, which is performed with operations 606-610. In a first iteration, search space 116 may correspond, for example, to search space 317, whereas in subsequent iterations, search space 116 may correspond, for example, to search spaces 327 and/or 337. In general, sampling a search space comprises training a set of candidate architectures with training data and testing the trained set of candidate architectures on test data.

Operation 606 includes 606 generating a set of candidate architectures 120 within search space 116. In some examples, the candidate architectures each comprise a model. In some examples, the candidate architectures each comprise an NN. Operation 608 includes, based on at least the set of candidate architectures 120, learning predictor 126. In a first iteration, predictor 126 may correspond, for example, to predictor 318, whereas in subsequent iterations, predictor 126 may correspond, for example, to predictors 328 and/or 338. Operation 610 includes evaluating performance of the set of candidate architectures 120 with predictor 126.

A decision operation 612 determines stopping criteria 110 has been met. In some examples, the stopping criteria comprises a specified maximum number of iterations. In some examples, the stopping criteria comprises a set of candidate architectures achieves a performance goal. In some examples, decision operation 612 corresponds to decision 210 of FIG. 2. If stopping criteria 110 has not been met, operation 614 includes, based on at least stopping criteria 110, further iterating refinement of search space 116. In some examples, this includes, based on at least the performance of the set of candidate architectures 120 and network architecture scoring information 104, refining search space 116 to a new, smaller version of search space 116. In some examples, refining search space 116 comprises shrinking search space 116 to a subset of search space 116. In some examples, refining search space 116 comprises thresholding the performance of the set of candidate architectures 120, for example by thresholding component 130 using refinement threshold 106.

In some examples, refining a first search space to a second search space comprises refining the first search space to at least one intervening search space smaller than the first search space and larger than the second search space. For example, search space 317 may be the first search space, search space 337 may be the second search space, and search space 327 may be the intervening search space. In some examples, operation 614 includes refining a first search space to a second search space smaller than the first search space, in which search space 317 is the first search space and search space 327 is the second search space. In some examples, a greater number of iterations is used (see FIG. 5).

If, however, stopping criteria 110 has been met, operation 616 includes, based on at least network architecture scoring information 104, thresholding the performance of the set of candidate architectures 120 to determine the set of scored output candidate architectures 140. In some examples, this is accomplished by thresholding component 130 using output threshold 108.; Operation 618 includes, based at least on network architecture scoring information 104, ranking the set of scored output candidate architectures 140. In some examples, this is accomplished by ranking component 132. Operation 620 includes reporting the set of scored output candidate architectures 140. In some examples, reporting the set of scored output candidate architectures 140 comprises reporting the set of ranked scored output candidate architectures 140.

Operation 622 includes, based at least on the set of scored output candidate architectures 140, selecting an architecture. In some examples, the selected architecture is selected automatically based on the ranking. In some examples, a user may select the architecture (or multiple architectures). Operation 624 includes, based at least on the set of scored output candidate architectures 140 (e.g., the architecture(s) selected in operation 622), constructing the ML model 152. Operation 626 includes employing the constructed ML model 152 to perform ML task 160. In some examples, ML task 160 is selected from the list consisting of: data mining, language processing, image classification, object detection, object recognition, language processing, and action understanding. Results for the ML task 160 are output in operation 628, for example, detecting ground-based vehicles (e.g., ships or trucks) from overhead imagery (e.g., aircraft or satellite), or language processing results (e.g., speech transcription).

Figure 7:
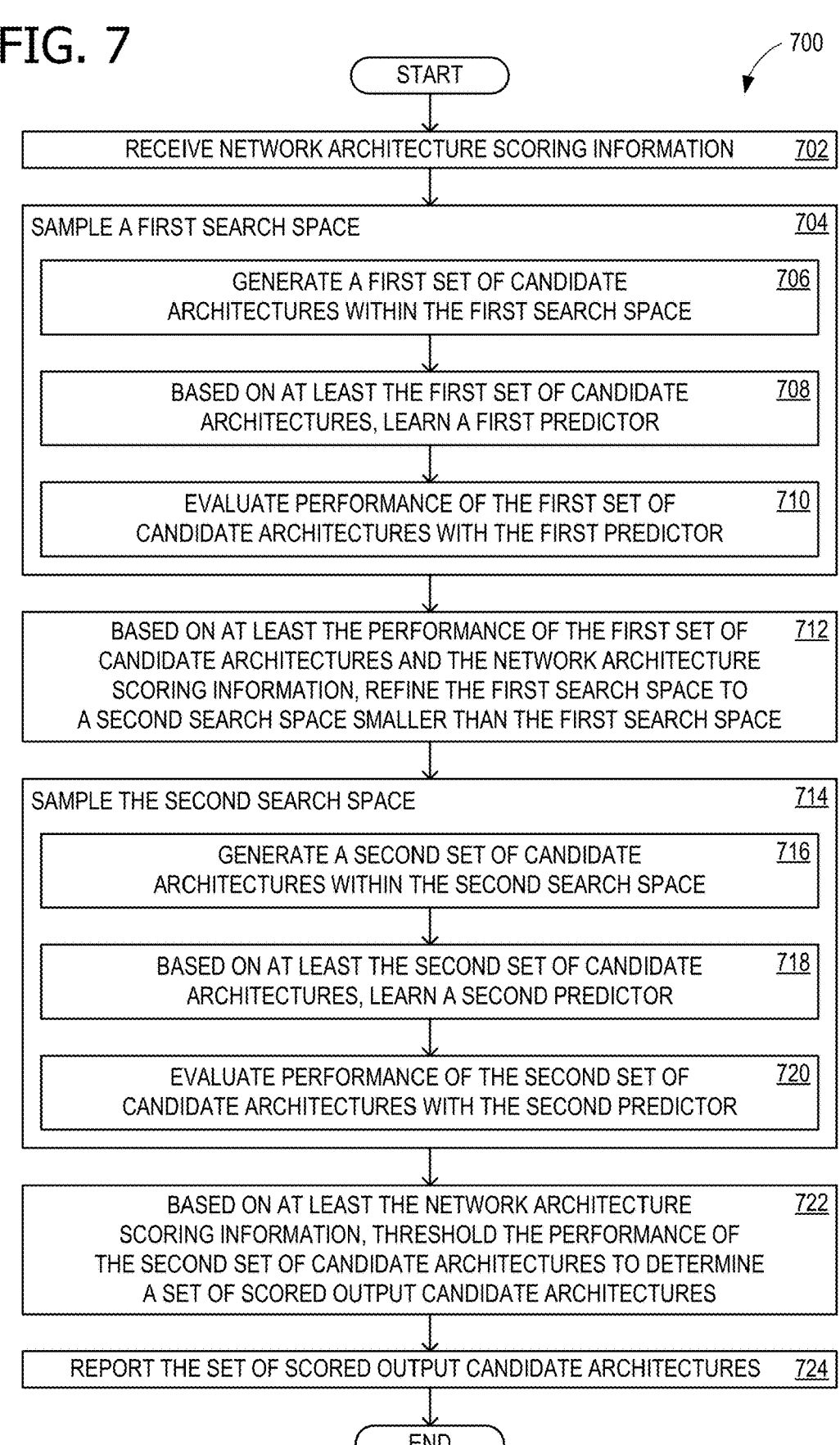
FIG. 7 is another flowchart illustrating exemplary operations associated with performing searching in a NAS process.

FIG. 7 is a flowchart 700 that illustrates exemplary operations involved in performing searching in a NAS process. In some examples, operations described for flowchart 700 are performed by computing device 800 of FIG. 8. Flowchart 700 commences with operation 702, which includes receiving network architecture scoring information. Operation 704 includes sampling a first search space and is accomplished using operations 706-710. Operation 706 includes generating a first set of candidate architectures within the first search space. Operation 708 includes, based on at least the first set of candidate architectures, learning a first predictor. Operation 710 includes evaluating performance of the first set of candidate architectures with the first predictor. Operation 712 includes, based on at least the performance of the first set of candidate architectures and the network architecture scoring information, refining the first search space to a second search space smaller than the first search space.

Operation 714 includes sampling the second search space and is accomplished using operations 716-720. Operation 716 includes generating a second set of candidate architectures within the second search space. Operation 718 includes, based on at least the second set of candidate architectures, learning a second predictor. Operation 720 includes evaluating performance of the second set of candidate architectures with the second predictor. Operation 722 includes, based on at least the network architecture scoring information, thresholding the performance of the second set of candidate architectures to determine a set of scored output candidate architectures. Operation 724 includes reporting the set of scored output candidate architectures.

Additional Examples

An example NAS method comprises: receiving network architecture scoring information; sampling a first search space, wherein sampling the first search space comprises: generating a first set of candidate architectures within the first search space; based on at least the first set of candidate architectures, learning a first predictor; evaluating performance of the first set of candidate architectures with the first predictor; based on at least the performance of the first set of candidate architectures and the network architecture scoring information, refining the first search space to a second search space smaller than the first search space; sampling the second search space, wherein sampling the second search space comprises: generating a second set of candidate architectures within the second search space; based on at least the second set of candidate architectures, learning a second predictor; evaluating performance of the second set of candidate architectures with the second predictor; based on at least the network architecture scoring information, thresholding the performance of the second set of candidate architectures to determine a set of scored output candidate architectures; and reporting the set of scored output candidate architectures.

An example NAS method comprises: receiving network architecture scoring information; iteratively sampling a neural architecture search (NAS) space, wherein sampling the search space comprises: generating a set of candidate architectures within the search space; based on at least the set of candidate architectures, learning a predictor; evaluating performance of the set of candidate architectures with the predictor; and refining the first search space to a smaller, new search space; based on at least the network architecture scoring information, thresholding the performance of the set of candidate architectures to determine a set of scored output candidate architectures; and reporting the set of scored output candidate architectures.

An example system for NAS comprises: a processor; and a computer-readable medium storing instructions that are operative upon execution by the processor to: receive network architecture scoring information; sample a first search space, wherein sampling the first search space comprises: generating a first set of candidate architectures within the first search space; based on at least the first set of candidate architectures, learning a first predictor; evaluating performance of the first set of candidate architectures with the first predictor; based on at least the performance of the first set of candidate architectures and the network architecture scoring information, refine the first search space to a second search space smaller than the first search space; sample the second search space, wherein sampling the second search space comprises: generating a second set of candidate architectures within the second search space; based on at least the second set of candidate architectures, learning a second predictor; evaluating performance of the second set of candidate architectures with the second predictor; based on at least the network architecture scoring information, threshold the performance of the second set of candidate architectures to determine a set of scored output candidate architectures; and report the set of scored output candidate architectures.

One or more example computer storage devices have computer-executable instructions stored thereon, which, on execution by a computer, cause the computer to perform operations comprising: receiving network architecture scoring information; sampling a first search space, wherein sampling the first search space comprises: generating a first set of candidate architectures within the first search space; based on at least the first set of candidate architectures, learning a first predictor; evaluating performance of the first set of candidate architectures with the first predictor; based on at least the performance of the first set of candidate architectures and the network architecture scoring information, refining the first search space to a second search space smaller than the first search space; sampling the second search space, wherein sampling the second search space comprises: generating a second set of candidate architectures within the second search space; based on at least the second set of candidate architectures, learning a second predictor; evaluating performance of the second set of candidate architectures with the second predictor; based on at least the network architecture scoring information, thresholding the performance of the second set of candidate architectures to determine a set of scored output candidate architectures; and reporting the set of scored output candidate architectures.

One or more example computer storage devices have computer-executable instructions stored thereon, which, on execution by a computer, cause the computer to perform operations comprising: receiving network architecture scoring information; iteratively sampling a neural architecture search (NAS) space, wherein sampling the search space comprises: generating a set of candidate architectures within the search space; based on at least the set of candidate architectures, learning a predictor; evaluating performance of the set of candidate architectures with the predictor; and refining the first search space to a smaller, new search space; based on at least the network architecture scoring information, thresholding the performance of the set of candidate architectures to determine a set of scored output candidate architectures; and reporting the set of scored output candidate architectures.

Alternatively, or in addition to the other examples described herein, examples may include any combination of the following:
  based at least on the set of scored output candidate architectures, constructing an ML model;
  employing the constructed ML model to perform an ML task;
  based at least on the network architecture scoring information, ranking the set of scored output candidate architectures;
  reporting the set of scored output candidate architectures comprises reporting the set of ranked scored output candidate architectures;
  based on at least stopping criteria, further iterating refinement of the first search space;
  refining the first search space to the second search space comprises refining the first search space to at least one intervening search space smaller than the first search space and larger than the second search space;
  the stopping criteria comprises a specified maximum number of iterations;
  the stopping criteria comprises a set of candidate architectures achieves a performance goal;
  refining the first search space comprises thresholding the performance of the first set of candidate architectures;
  the candidate architectures each comprise an ML model;
  the predictors each comprise an NN;
  the candidate architectures each comprise an NN;
  refining a search space comprises shrinking to a subset;
  the ML task is selected from the list consisting of: data mining, language processing, image classification, object detection, object recognition, language processing, and action understanding; and
  sampling a search space comprises training a set of candidate architectures with training data and testing the trained set of candidate architectures on test data.

While the aspects of the disclosure have been described in terms of various examples with their associated operations, a person skilled in the art would appreciate that a combination of operations from any number of different examples is also within scope of the aspects of the disclosure.

Example Operating Environment

FIG. 8 is a block diagram of an example computing device 800 for implementing aspects disclosed herein, and is designated generally as computing device 800. Computing device 800 is but one example of a suitable computing environment and is not intended to suggest any limitation as to the scope of use or functionality of the examples disclosed herein. Neither should computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 800 includes a bus 810 that directly or indirectly couples the following devices: computer-storage memory 812, one or more processors 814, one or more presentation components 816, I/O ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more busses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer-storage media references below and operatively provide storage of computer-readable instructions, data structures, program modules and other data for the computing device 800. In some examples, memory 812 stores one or more of an operating system, a universal application platform, or other program modules and program data. Memory 812 is thus able to store and access data 812a and instructions 812b that are executable by processor 814 and configured to carry out the various operations disclosed herein.

In some examples, memory 812 includes computer-storage media in the form of volatile and/or nonvolatile memory, removable or non-removable memory, data disks in virtual environments, or a combination thereof. Memory 812 may include any quantity of memory associated with or accessible by the computing device 800. Memory 812 may be internal to the computing device 800 (as shown in FIG. 8), external to the computing device 800 (not shown), or both (not shown). Examples of memory 812 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 800. Additionally, or alternatively, the memory 812 may be distributed across multiple computing devices 800, for example, in a virtualized environment in which instruction processing is carried out on multiple devices 800. For the purposes of this disclosure, "computer storage media," "computer-storage memory," "memory," and "memory devices" are synonymous terms for the computer-storage memory 812, and none of these terms include carrier waves or propagating signaling.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represent an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

The computing device 800 may operate in a networked environment via the network component 824 using logical connections to one or more remote computers. In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 824 communicates over wireless communication link 826 and/or a wired communication link 826a to a cloud resource 828 across network 830. Various different examples of communication links 826 and 826a include a wireless connection, a wired connection, and/or a dedicated link, and in some examples, at least a portion is routed through the internet.

Although described in connection with an example computing device 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of neural architecture search (NAS) using progressively stronger predictors to sample progressively smaller search spaces, the method comprising:

receiving network architecture scoring information;

sampling, during a first iteration, a first subset of candidate architectures within a first search space, wherein at least some candidate architectures within the first search space go unsampled during the first iteration;

learning a first predictor based on at least the first subset of candidate architectures sampled during the first iteration, the first predictor bi-furcating the first search space;

evaluating performance of the first subset of candidate architectures with the first predictor based on validation accuracy as a function of a number of samples used by the corresponding candidate architecture;

based on at least the performance of the first subset of candidate architectures and the network architecture scoring information, refining the first search space to a second search space smaller than the first search space, the second search space including fewer candidate architectures than the first search space;

sampling, during a second iteration, a second subset of candidate architectures within the second search space, wherein at least some candidate architectures within the second search space go unsampled during the second iteration, and wherein the second subset of candidate architectures includes at least one candidate architecture from the first subset of candidate architectures that has been trained based on training data from the second search space;

learning a second predictor based on at least the second subset of candidate architectures, the first predictor based on sparser samples than the second predictor such that the first predictor is weaker than the second predictor, wherein the relative strength of respective predictors is based on the relative sparsity of search space samplings used to generate the respective predictors such that weaker predictors are generated from sparser search space samplings than stronger predictors;

evaluating performance of the second subset of candidate architectures with the second predictor;

based on at least the performance of the second subset of candidate architectures and the network architecture scoring information, ranking the second subset of candidate architectures to determine ranked output candidate architectures; and reporting the ranked output candidate architectures, wherein at least two of the ranked output candidate architectures are trained for image classification using training data and tested using testing data to select an optimal architecture for training a neural network model for image classification.

2. The method of claim 1, wherein refining the first search space comprises thresholding the performance of the first subset of candidate architectures.

3. The method of claim 1, wherein the candidate architectures each comprise a machine learning (ML) model.

4. A system for neural architecture search (NAS), the system comprising:

a processor; and a non-transitory computer-readable medium storing instructions that are operative upon execution by the processor to:

receive network architecture scoring information;

sample, during a first iteration, a first subset of candidate architectures within a first search space, wherein at least some candidate architectures within the first search space go unsampled during the first iteration;

learn a first predictor based on at least the first subset of candidate architectures sampled during the first iteration, the first predictor bi-furcating the first search space;

evaluate performance of the first subset of candidate architectures with the first predictor based on validation accuracy as a function of a number of samples used by the corresponding candidate architecture;

based on at least the performance of the first subset of candidate architectures and the network architecture scoring information, refine the first search space to a second search space smaller than the first search space, the second search space including fewer candidate architectures than the first search space;

sample, during a second iteration, a second subset of candidate architectures within the second search space, wherein at least some candidate architectures within the second search space go unsampled during the second iteration, and wherein the second subset of candidate architectures includes at least one candidate architecture from the first subset of candidate architectures that has been trained based on training data from the second search space;

learn a second predictor based on at least the second subset of candidate architectures, the first predictor based on sparser samples than the second predictor such that the first predictor is weaker than the second predictor, wherein the relative strength of respective predictors is based on the relative sparsity of search space samplings used to generate the respective predictors such that weaker predictors are generated from sparser search space samplings than stronger predictors;

evaluate performance of the second subset of candidate architectures with the second predictor;

based on at least the performance of the second subset of candidate architectures and the network architecture scoring information, rank the second subset of candidate architectures to determine ranked output candidate architectures; and report the ranked output candidate architectures, wherein at least two of the ranked output candidate architectures are trained for image classification using training data and tested using testing data to select an optimal architecture for training a neural network model for image classification.

5. The system of claim 4, wherein refining the first search space comprises thresholding the performance of the first subset of candidate architectures.

6. The system of claim 4, wherein the candidate architectures each comprise a machine learning (ML) model.

7. One or more computer storage devices having computer-executable instructions thereon for performing a neural architecture search (NAS) using progressively stronger predictors to sample progressively smaller search spaces, which, on execution by a computer, cause the computer to perform operations comprising:

receiving network architecture scoring information;

sampling, during a first iteration, a first subset of candidate architectures within a first search space, wherein at least some candidate architectures within the first search space go unsampled during the first iteration;

learning a first predictor based on at least the first subset of candidate architectures sampled during the first iteration, the first predictor bi-furcating the first search space;

evaluating performance of the first subset of candidate architectures with the first predictor based on validation accuracy as a function of a number of samples used by the corresponding candidate architecture;

based on at least the performance of the first subset of candidate architectures and the network architecture scoring information, refining the first search space to a second search space smaller than the first search space, the second search space including fewer candidate architectures than the first search space;

sampling, during a second iteration, a second subset of candidate architectures within the second search space, wherein at least some candidate architectures within the second search space go unsampled during the second iteration, and wherein the second subset of candidate architectures includes at least one candidate architecture from the first subset of candidate architectures that has been trained based on training data from the second search space;

learning a second predictor based on at least the second subset of candidate architectures, the first predictor based on sparser samples than the second predictor such that the first predictor is weaker than the second predictor, wherein the relative strength of respective predictors is based on the relative sparsity of search space samplings used to generate the respective predictors such that weaker predictors are generated from sparser search space samplings than stronger predictors;

evaluating performance of the second subset of candidate architectures with the second predictor;

based on at least the performance of the second subset of candidate architectures and the network architecture scoring information, ranking the second subset of candidate architectures to determine ranked output candidate architectures; and reporting the ranked output candidate architectures, wherein at least two of the ranked output candidate architectures are trained for image classification using training data and tested using testing data to select an optimal architecture for training a neural network model for image classification.

8. The one or more computer storage devices of claim 7, wherein refining the first search space comprises thresholding the performance of the first subset of candidate architectures.

9. The one or more computer storage devices of claim 7, wherein the operations further comprise:

training the neural network model for image classification based on the optimal architecture.

10. The one or more computer storage devices of claim 7, wherein refining the first search space comprises iteratively refining the first search space until a stopping criteria has been met, wherein iteratively refining the first search space produces at least one intervening search space smaller than the first search space and larger than the second search space.

11. The one or more computer storage devices of claim 7, wherein at least one candidate architecture from the second search space is excluded from the ranked output candidate architectures.

12. The system of claim 4, further comprising:

training the neural network model for image classification based on the optimal architecture.

13. The system of claim 4, wherein refining the first search space comprises iteratively refining the first search space until a stopping criteria has been met, wherein iteratively refining the first search space produces at least one intervening search space smaller than the first search space and larger than the second search space.

14. The system of claim 13, wherein the stopping criteria is met after a specified maximum number of refinement iterations.

15. The system of claim 13, wherein the stopping criteria is met upon determining that the first subset of candidate architectures has achieved a performance goal.

16. The system of claim 4, wherein at least one candidate architecture from the second search space is excluded from the ranked output candidate architectures.

17. The method of claim 1, further comprising:

training the neural network model for image classification based on the optimal architecture.

18. The method of claim 1, wherein refining the first search space comprises iteratively refining the first search space until a stopping criteria has been met, wherein iteratively refining the first search space produces at least one intervening search space smaller than the first search space and larger than the second search space.

19. The method of claim 18, wherein the stopping criteria is met after a specified maximum number of refinement iterations.

20. The method of claim 18, wherein the stopping criteria is met upon determining that the first subset of candidate architectures has achieved a performance goal.

\* \* \* \* \*